(12) United States Patent
Chen et al.

(10) Patent No.: US 9,747,090 B2
(45) Date of Patent: Aug. 29, 2017

(54) APPLICATION DEPLOYMENT METHOD AND SCHEDULER

(71) Applicant: Huawei Technologies Co., Ltd., Shenzhen, Guangdong (CN)

(72) Inventors: Jian Chen, Nanjing (CN); Hanyu Wei, Nanjing (CN); Hong Zhou, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 14/755,259

(22) Filed: Jun. 30, 2015

(65) Prior Publication Data

US 2015/0301814 A1 Oct. 22, 2015

Related U.S. Application Data

(63) Continuation of application No. PCT/CN2013/090201, filed on Dec. 23, 2013.

(30) Foreign Application Priority Data

Dec. 31, 2012 (CN) .......................... 2012 1 0592212

(51) Int. Cl.
*G06F 9/445* (2006.01)
*H04L 29/08* (2006.01)

(52) U.S. Cl.
CPC ................ *G06F 8/60* (2013.01); *H04L 67/10* (2013.01); *H04L 67/32* (2013.01)

(58) Field of Classification Search
CPC ............ G06F 8/60; H04L 67/10; H04L 67/32
See application file for complete search history.

(56) References Cited

U.S. PATENT DOCUMENTS

2008/0127170 A1* 5/2008 Goldman .................. G06F 8/61
717/174
2010/0131624 A1 5/2010 Ferris
(Continued)

FOREIGN PATENT DOCUMENTS

CN 101951411 A 1/2011
CN 101977242 A 2/2011
(Continued)

OTHER PUBLICATIONS

Paul Francis, et al., "An Architecture for a Global Internet Host Distance Estimation Service", IEEE, 1999, p. 210-217.
(Continued)

*Primary Examiner* — Viva Miller

(57) ABSTRACT

An application deployment method and a scheduler are disclosed. The method includes: receiving, by a scheduler, an application deployment request sent for a first application by a cloud controller of a first cloud; after receiving the application deployment request, sending, by the scheduler, a first query message and a second query message to a cloud controller of a second cloud, and sending a second query message to a cloud controller of a third cloud; determining, by the scheduler, a target calculation unit from at least one calculation unit that is obtained by querying by using the first query message and the second query message and that has a first calculation capability; and deploying, by the scheduler, the first application to the target calculation unit.

10 Claims, 10 Drawing Sheets

(56) References Cited

U.S. PATENT DOCUMENTS

| | | | |
|---|---|---|---|
| 2012/0011190 A1* | 1/2012 | Driesen | G06Q 10/06 709/202 |
| 2012/0072579 A1 | 3/2012 | Teather | |
| 2012/0239739 A1* | 9/2012 | Manglik | G06F 9/5077 709/203 |
| 2012/0317168 A1* | 12/2012 | Driesen | G06Q 10/06 709/202 |

FOREIGN PATENT DOCUMENTS

| | | |
|---|---|---|
| CN | 102111337 A | 6/2011 |
| CN | 102281329 A | 12/2011 |
| CN | 102316157 A | 1/2012 |
| CN | 102369714 A | 3/2012 |
| CN | 102427481 A | 4/2012 |
| CN | 102739798 A | 10/2012 |
| EP | 2 405 386 A2 | 1/2012 |
| WO | WO 2008/027916 A2 | 3/2008 |

OTHER PUBLICATIONS

R. Alimi, Ed, et al., "ALTO Protocol", Sep. 7, 2012, 67 pages.
T.S. Eugene Ng, et al., "Towards Global Network Positioning", Proceedings of the 1st ACM SIGCOM Workshop on Internet measurement, Nov. 1-2, 2001, p. 25-29.

* cited by examiner

APPLICATION DEPLOYMENT METHOD AND SCHEDULER

CROSS-REFERENCE TO RELATED APPLICATION

This application is a continuation of International Application No. PCT/CN2013/090201, filed on Dec. 23, 2013, which claims priority to Chinese Patent Application No. 201210592212.4, filed on Dec. 31, 2012, both of which are hereby incorporated by reference in their entireties.

TECHNICAL FIELD

The present invention relates to the field of communications, and in particular, to an application deployment method and a scheduler.

BACKGROUND

In recent years, with rapid development of the Internet, cloud computing services also develop vigorously. However, generally, a distance between a cloud computing server and a user terminal is relatively long, resulting in a relatively large network delay and causing undesirable user experience of some services. A layered cloud computing concept is therefore proposed, in which, a part of cloud computing is pushed to an edge closer to a user, to shorten a network delay and enhance user experience. A new cloud computing network includes a central cloud and a front-end cloud. Similar to a conventional cloud computing server, the central cloud usually includes a large-scale data center and is preferably deployed in a core city. The front-end cloud includes a small or medium-scale data center and is preferably deployed in a small or medium-sized city.

An architecture in which a central cloud and a front-end cloud are adopted may enhance user experience; however, because multiple clouds appear on a network, how to select a suitable cloud to deploy an application for the application becomes an urgent problem to be resolved.

SUMMARY

An objective of embodiments of the present invention is to provide an application deployment method and a scheduler, which are used to select a suitable cloud on a network including multiple clouds to deploy a first application.

According to a first aspect, an application deployment method includes:

receiving, by a scheduler, an application deployment request sent for a first application by a cloud controller of a first cloud;

after receiving the application deployment request, sending, by the scheduler, a first query message to a cloud controller of a second cloud, where the first query message includes information about a calculation capability required for the first application, the first query message is used to query identifier information of a calculation unit that is in the second cloud and that has the calculation capability, and the calculation capability required for the first application is a first calculation capability;

after receiving the application deployment request, sending, by the scheduler, a second query message to a cloud controller of a third cloud, where the second query message includes the information about the first calculation capability, and the second query message is used to query identifier information of a calculation unit that is in the third cloud and that has the first calculation capability;

determining, by the scheduler, a target calculation unit from at least one calculation unit that is obtained by querying by using the first query message and the second query message and that has the first calculation capability; and deploying, by the scheduler, the first application to the target calculation unit after determining that a runtime library required for the first application is installed in the target calculation unit, where the scheduler is configured to manage the first cloud, the second cloud, and the third cloud.

Optionally, according to the first aspect, in a first implementation manner of the first aspect, the deploying, by the scheduler, the first application to the target calculation unit after determining that a runtime library required for the first application is installed in the target calculation unit includes:

sending, by the scheduler, a runtime library query message to a cloud controller corresponding to the target calculation unit, and querying whether the runtime library required for the first application is installed in the target calculation unit;

after determining that the runtime library is not installed in the target calculation unit, informing the target calculation unit to install the runtime library; and after the target calculation unit completes the installation of the runtime library, deploying, by the scheduler, the first application to the target calculation unit.

Optionally, according to the first aspect, in a second implementation manner of the first aspect, the deploying, by the scheduler, the first application to the target calculation unit after determining that a runtime library required for the first application is installed in the target calculation unit includes:

sending, by the scheduler, a runtime library query message to a cloud controller corresponding to the target calculation unit, and querying whether the runtime library required for the first application is installed in the target calculation unit; and after determining that the runtime library is installed in the target calculation unit, deploying the first application to the target calculation unit.

Optionally, according to the first aspect, the first implementation manner of the first aspect, or the second implementation manner of the first aspect, in a third implementation manner of the first aspect, the information about the first calculation capability includes any one or more of a central processing unit (CPU) dominant frequency, a memory capacity, network bandwidth information, and programming language running environment information.

Optionally, according to the first aspect or any one of the first to the third implementation manners of the first aspect, in a fourth implementation manner of the first aspect, when the at least one calculation unit is more than one calculation unit, the target calculation unit is:

a calculation unit that has a shortest distance from a user terminal requesting the first application and that is in the more than one calculation unit having the first calculation capability.

Optionally, according to the fourth implementation manner of the first aspect, in a fifth implementation manner of the first aspect, the distance includes a physical distance, a network distance, or a weight distance.

Optionally, according to the first aspect or any one of the first to the fifth implementation manners of the first aspect, in a sixth implementation manner of the first aspect, the first cloud is a first central cloud, the second cloud is a first front-end cloud, and the third cloud is a second front-end cloud;

or, the first cloud is a first front-end cloud, the second cloud is a first central cloud, and the third cloud is a second central cloud;

or, the first cloud is a first front-end cloud, the second cloud is a second front-end cloud, and the third cloud is a third front-end cloud.

According to a second aspect, a scheduler is configured to manage a first cloud, a second cloud, and a third cloud, and the scheduler includes:

a receiving unit, configured to receive an application deployment request sent for a first application by a cloud controller of the first cloud;

a first sending unit, configured to: after the receiving unit receives the application deployment request, send a first query message to a cloud controller of the second cloud, where the first query message includes information about a calculation capability required for the first application, the first query message is used to query identifier information of a calculation unit that is in the second cloud and that has the calculation capability, and the calculation capability required for the first application is a first calculation capability;

a second sending unit, configured to: after the receiving unit receives the application deployment request, send a second query message to a cloud controller of the third cloud, where the second query message includes the information about the first calculation capability, and the second query message is used to query identifier information of a calculation unit that is in the third cloud and that has the first calculation capability;

a determining unit, configured to determine a target calculation unit from at least one calculation unit that is obtained by querying by using the first query message and the second query message and that has the first calculation capability; and a deploying unit, configured to: after it is determined that a runtime library required for the first application is installed in the target calculation unit, deploy the first application to the target calculation unit.

Optionally, according to the second aspect, in a first implementation manner of the second aspect, the deploying unit is specifically configured to:

send a runtime library query message to a cloud controller corresponding to the target calculation unit, and query whether the runtime library required for the first application is installed in the target calculation unit;

after it is determined that the runtime library is not installed in the target calculation unit, inform the target calculation unit to install the runtime library; and after the target calculation unit completes the installation of the runtime library, deploy the first application to the target calculation unit.

Optionally, according to the second aspect, in a second implementation manner of the second aspect, the deploying unit is specifically configured to:

send a runtime library query message to a cloud controller corresponding to the target calculation unit, and query whether the runtime library required for the first application is installed in the target calculation unit; and after it is determined that the runtime library is installed in the target calculation unit, deploy the first application to the target calculation unit.

Optionally, according to the second aspect, the first implementation manner of the second aspect, or the second implementation manner of the second aspect, in a third implementation manner of the second aspect, the information about the first calculation capability includes any one or more of a central processing unit (CPU) dominant frequency, a memory capacity, network bandwidth information, and programming language running environment information.

Optionally, according to the second aspect or any one of the first to the third implementation manners of the first aspect, in a fourth implementation manner of the second aspect, when the at least one calculation unit is more than one calculation unit, the target calculation unit is:

a calculation unit that has a shortest distance from a user terminal requesting the first application and that is in the more than one calculation unit having the first calculation capability.

Optionally, according to the fourth implementation manner of the second aspect, in a fifth implementation manner of the second aspect, the distance includes a physical distance, a network distance, or a weight distance.

Optionally, according to the second aspect or any one of the first to the fifth implementation manners of the first aspect, in a sixth implementation manner of the second aspect, the first cloud is a first central cloud, the second cloud is a first front-end cloud, and the third cloud is a second front-end cloud;

or, the first cloud is a first front-end cloud, the second cloud is a first central cloud, and the third cloud is a second central cloud;

or, the first cloud is a first front-end cloud, the second cloud is a second front-end cloud, and the third cloud is a third front-end cloud.

In the embodiments of the present invention, a scheduler first determines, from a second cloud and a third cloud, a calculation unit having a calculation capability required for a first application, then determines a target calculation unit from the determined calculation unit, and in a case in which a runtime library is installed in the target calculation unit, deploys the first application to the target calculation unit, to determine one suitable cloud from a network including multiple clouds to deploy the first application.

DETAILED DESCRIPTION

The present invention is described in detail in the following with reference to the accompanying drawings and specific embodiments. However, it should be noted that the following embodiments are only intended to help understand examples given for the technical solutions, rather than to limit the present invention.

An embodiment of the present invention discloses an application deployment method, and this method is applicable to a network including a central cloud and a front-end cloud.

Figure 1:
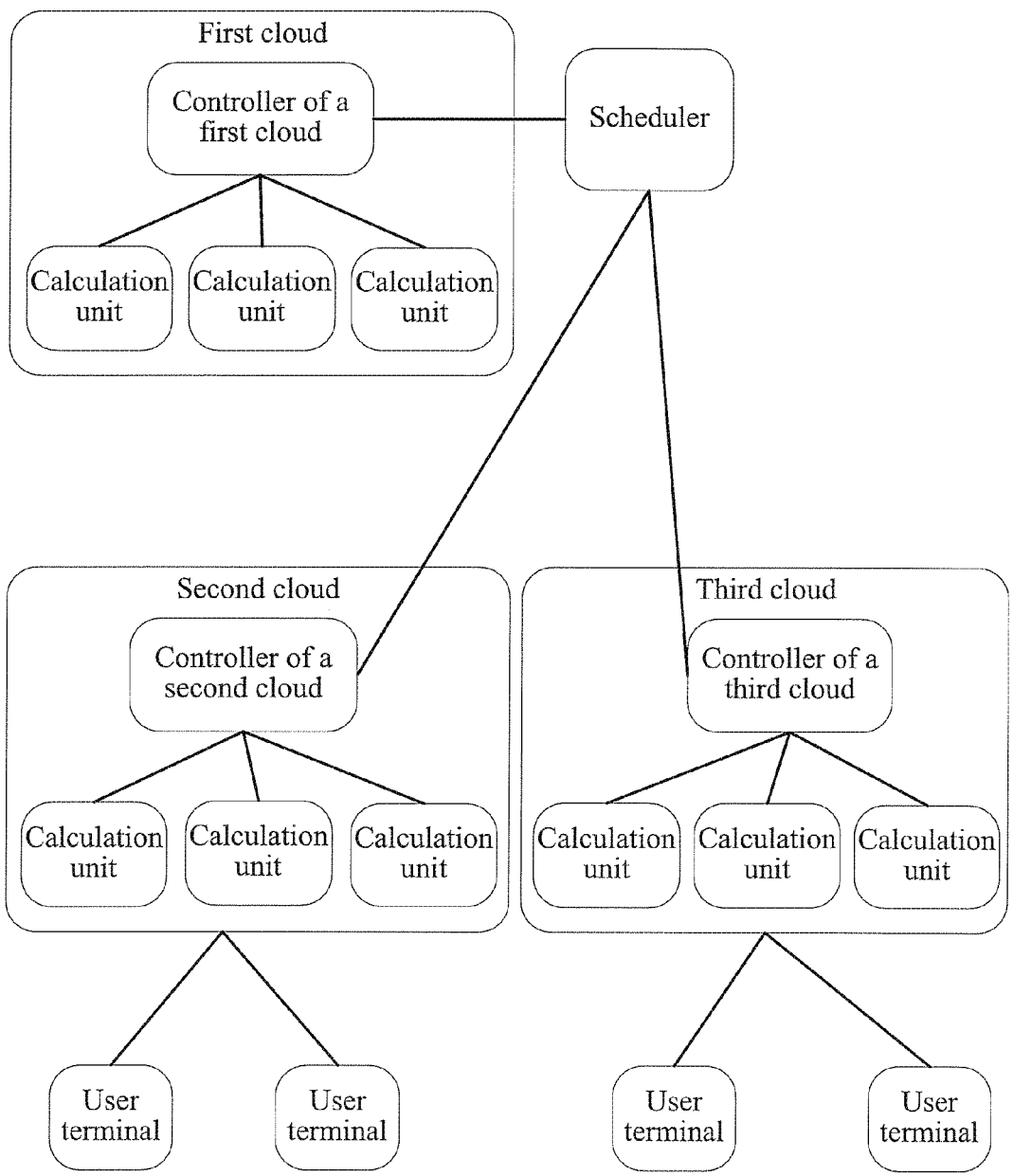
FIG. 1 is a schematic diagram of a network according to an embodiment of the present invention.

FIG. 1 is a schematic diagram of a network including a central cloud and a front-end cloud. FIG. 1 shows three clouds, which are a first cloud, a second cloud, and a third cloud. Each cloud includes a respective cloud controller and a respective calculation unit. The network shown in FIG. 1 may further include one or more other clouds.

Figure 2:
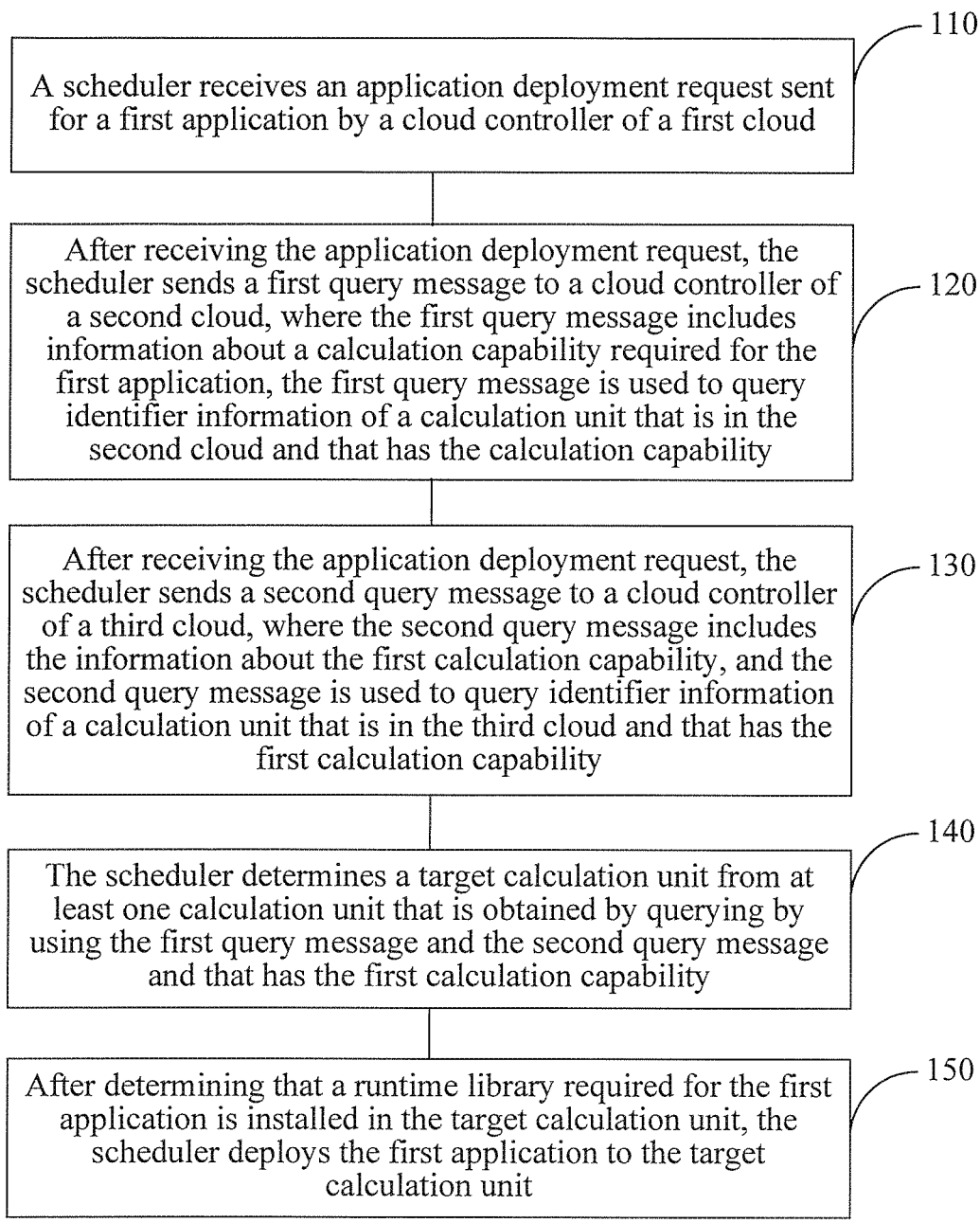
FIG. 2 is a schematic diagram of an application deployment method according to an embodiment of the present invention.

Based on the network shown in FIG. 1, as shown in FIG. 2, an application deployment method includes the following content.

110. A scheduler receives an application deployment request sent for a first application by a cloud controller of a first cloud.

120. After receiving the application deployment request, the scheduler sends a first query message to a cloud controller of a second cloud, where the first query message includes information about a calculation capability required for the first application, the first query message is used to query identifier information of a calculation unit that is in the second cloud and that has the calculation capability, and the calculation capability required for the first application is a first calculation capability.

Optionally, the information about the first calculation capability includes any one or more of a central processing unit (CPU) dominant frequency, a memory capacity, network bandwidth information, and programming language running environment information.

130. After receiving the application deployment request, the scheduler sends a second query message to a cloud controller of a third cloud, where the second query message includes the information about the first calculation capability, and the second query message is used to query identifier information of a calculation unit that is in the third cloud and that has the first calculation capability.

It should be noted that, 120 and 130 are independent from each other, 120 may be performed before 130, or may also be performed after 130, or may further be performed at the same time as 130.

140. The scheduler determines a target calculation unit from at least one calculation unit that is obtained by querying by using the first query message and the second query message and that has the first calculation capability.

There may be only one calculation unit that is obtained by querying by using the first query message and the second query message and that has the first calculation capability, that is, one cloud of the second cloud and the third cloud includes a unique calculation unit having the first calculation capability, and the other cloud does not include a calculation unit having the first calculation capability.

Certainly, the second cloud and the third cloud also may include a calculation unit having the first calculation capability each, and therefore there may also be more than one calculation unit that is obtained by querying by the scheduler and that has the first calculation capability.

Optionally, when only one calculation unit having the first calculation capability is obtained by querying, the unique calculation unit is the target calculation unit.

Optionally, when more than one calculation unit having the first calculation capability is obtained by querying, the target calculation unit is: a calculation unit that has a shortest distance from a user terminal requesting the first application and that is in the more than one calculation unit having the first calculation capability. Optionally, the distance includes a physical distance, a network distance, or a weight distance.

Optionally, when more than one calculation unit having the first calculation capability is obtained by querying, the target calculation unit may also be a calculation unit randomly selected by the scheduler from the calculation unit that are obtained by querying and that have the first calculation capability.

The physical distance refers to a distance between two physical devices, which is determined according to respective physical positions of the two physical devices. For example, the physical positions may be in latitude and longitude coordinates.

The network distance refers to a forward hop count between two physical devices or a period of time during which a packet is transmitted between two physical devices.

The weight distance refers to a product of multiplying a physical distance by a weight coefficient, or, a product of multiplying a network distance by a weight coefficient.

150. After determining that a runtime library required for the first application is installed in the target calculation unit, the scheduler deploys the first application to the target calculation unit.

Optionally, 150 specifically includes: sending, by the scheduler, a runtime library query message to a cloud controller corresponding to the target calculation unit, and querying whether the runtime library required for the first application is installed in the target calculation unit.

Optionally, after it is determined that the runtime library is not installed in the target calculation unit, the target calculation unit is notified of installing the runtime library.

After the target calculation unit completes the installation of the runtime library, the scheduler deploys the first application to the target calculation unit.

Optionally, after determining that the runtime library is installed in the target calculation unit, the scheduler deploys the first application to the target calculation unit.

That the scheduler deploys the first application to the target calculation unit may be understood as that the scheduler itself deploys the first application to the target calculation unit, or may also be understood as that the scheduler controls or manages another device, and the another device deploys the first application to the target calculation unit.

Optionally, the runtime library includes rails, event machine (eventmachine), or another runtime library.

In this embodiment, the scheduler implements, through 110 to 150, management of the first cloud, the second cloud, and the third cloud. In addition, it is possible that the scheduler does not belong to or is independent from the first cloud, the second cloud, and the third cloud, or the scheduler may also be integrated in the cloud controller of the first cloud, the cloud controller of the second cloud, or the cloud controller of the third cloud.

In addition, on a network including clouds, different clouds may play different roles; for example, a cloud that is located in the center of the network may be referred to as a central cloud, and a cloud that is located between the central cloud and a user may be referred to as a front-end cloud. The first cloud, the second cloud, and the third cloud in this embodiment may play respective roles.

For example, the first cloud is a first central cloud, the second cloud is a first front-end cloud, and the third cloud is a second front-end cloud; or, the first cloud is a first front-end cloud, the second cloud is a first central cloud, and the third cloud is a second central cloud; or, the first cloud is a first front-end cloud, the second cloud is a second front-end cloud, and the third cloud is a third front-end cloud.

Figure 3A:
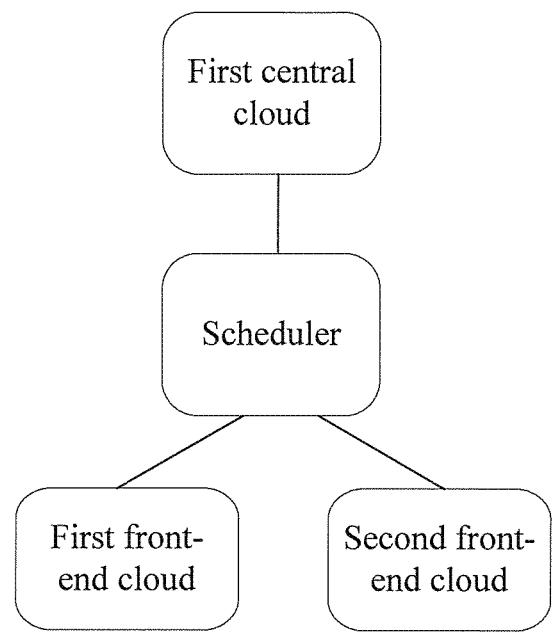
FIG. 3a is a schematic diagram of a network according to an embodiment of the present invention.
Figure 3B:
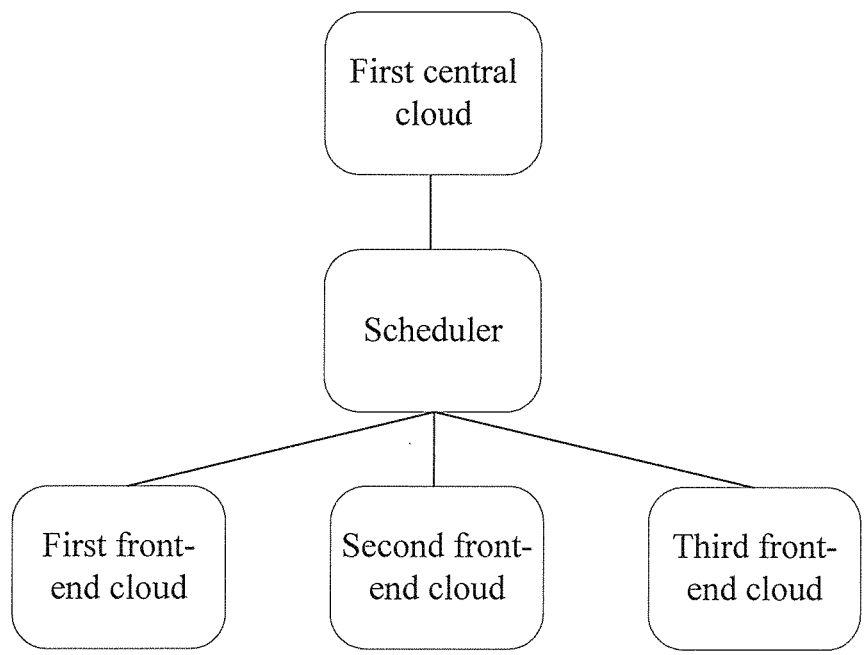
FIG. 3b is a schematic diagram of a network according to an embodiment of the present invention.
Figure 3C:
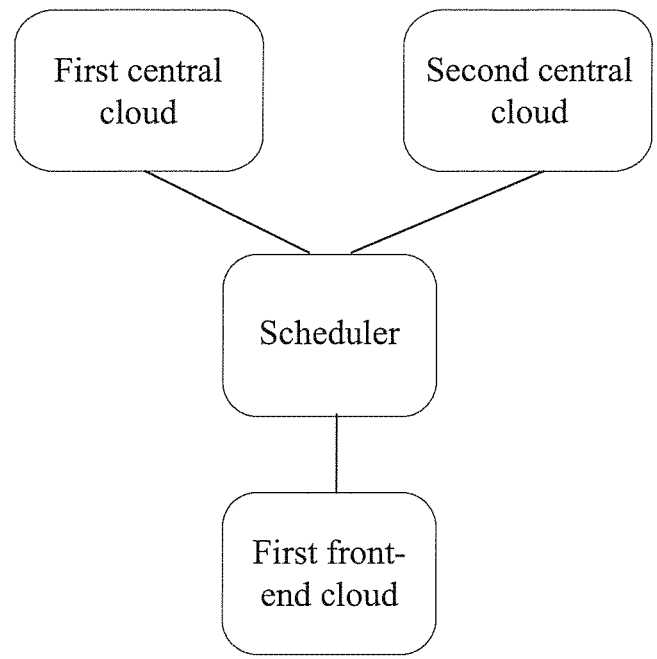
FIG. 3c is a schematic diagram of a network according to an embodiment of the present invention.
Figure 3D:
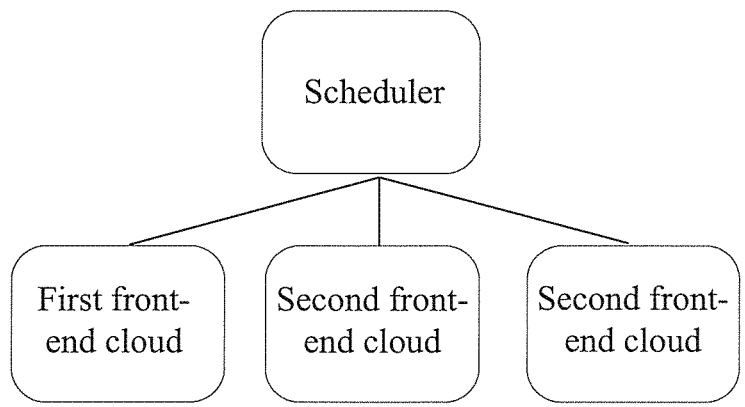
FIG. 3d is a schematic diagram of a network according to an embodiment of the present invention.

When the first cloud is a first central cloud, the second cloud is a first front-end cloud, and the third cloud is a second front-end cloud, a brief schematic diagram of the network may be shown in FIG. 3a;

when the network shown in FIG. 3a further includes a third front-end cloud, a schematic diagram of the network is shown in FIG. 3b;

when the first cloud is a first front-end cloud, the second cloud is a first central cloud, and the third cloud is a second central cloud, a brief schematic diagram of the network is shown in FIG. 3c; and when the first cloud is a first front-end cloud, the second cloud is a second front-end cloud, and the third cloud is a third front-end cloud, a brief schematic diagram of the network is shown FIG. 3d.

As can be known from the content in this embodiment, a scheduler first determines, from a second cloud and a third cloud, a calculation unit having a calculation capability required for a first application, then determines a target calculation unit from the determined calculation unit, and in a case in which a runtime library is installed in the target calculation unit, deploys the first application in a first cloud to the target calculation unit, to determine one suitable cloud from a network including multiple clouds to deploy the first application.

Figure 4:
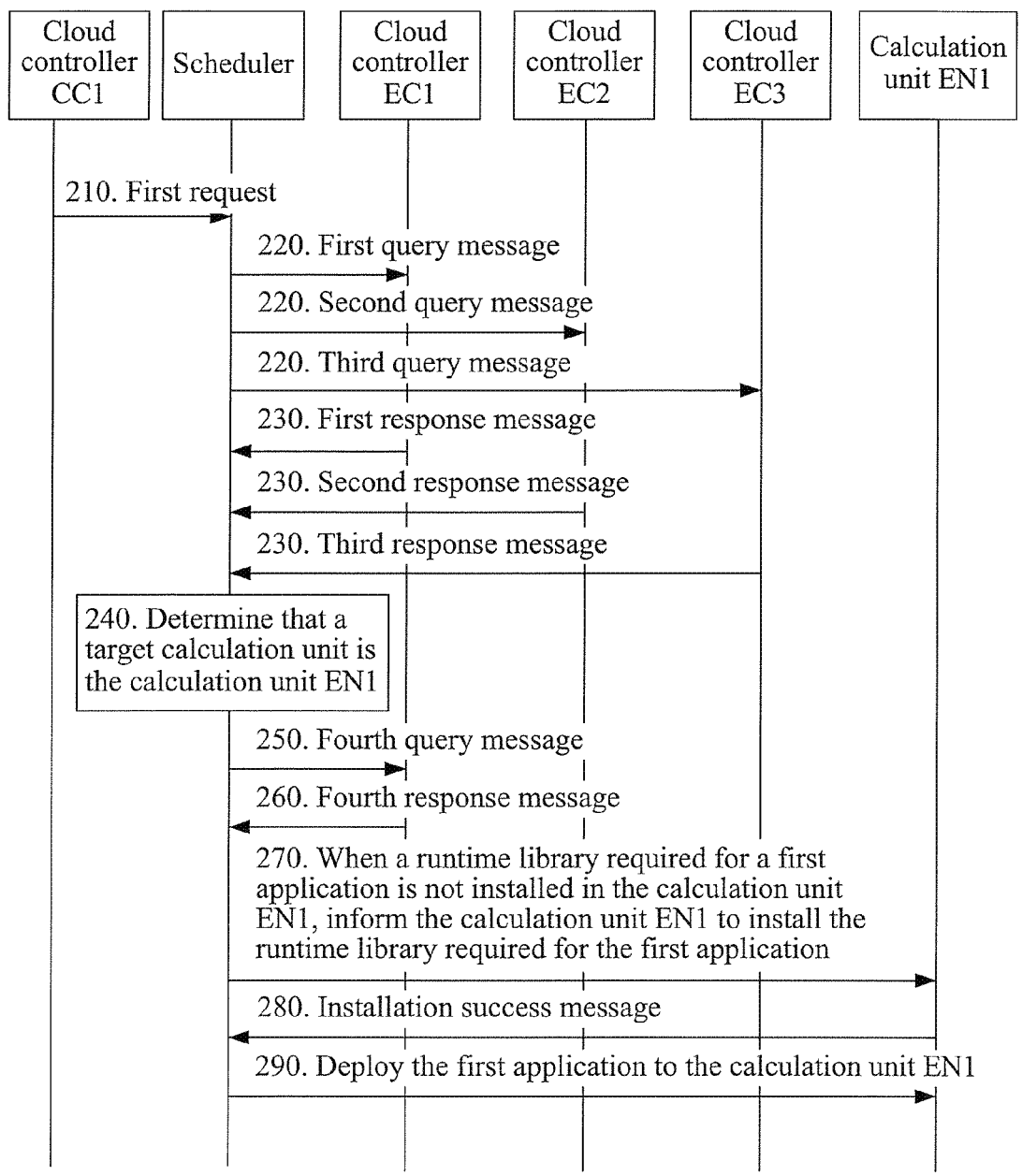
FIG. 4 is a schematic diagram of an application deployment method according to an embodiment of the present invention.

An embodiment shown in FIG. 4 discloses an application deployment method, which is applicable to the network shown in FIG. 3b. The method is used to deploy a first application in a front-end cloud to a front-end cloud, and specifically includes the following content.

210. A cloud controller CC1 of a first central cloud sends a first request to a scheduler, to request deploying the first application in the front-end cloud.

The first request includes information about a calculation capability required for the first application; herein, the calculation capability required for the first application may be referred to as a first calculation capability.

The information about the first calculation capability includes anyone or more of a CPU dominant frequency, a memory capacity, network bandwidth, and a programming language running environment. In a specific example of the information about the first calculation capability in this embodiment, the information about the first caculation capability includes: the CPU dominant frequency being 1.0 GHz, the memory capacity being 512 MB, the network bandwidth being 100 Mbps, and the programming language running environment being Ruby 1.9.

220. The scheduler sends a query message to a cloud controller EC1, a cloud controller EC2, and a cloud controller EC3 separately, that is, the scheduler sends a first query message to the cloud controller EC1, sends a second query message to the cloud controller EC2, and sends a third query message to the cloud controller EC3. The cloud controller EC1, the cloud controller EC2, and the cloud controller EC3 are a cloud controller of a first front-end cloud, a cloud controller of a second front-end cloud, and a cloud controller of a third front-end cloud, respectively. The first front-end cloud includes a calculation unit EN1, the second front-end cloud includes a calculation unit EN2, and the third front-end cloud includes a calculation unit EN3. 220 may also be understood as three operations without an order.

The first query message, the second query message, and the third query message all include the information about the first calculation capability. The first query message is used to query identifier information of a calculation unit that is in the first front-end cloud and that has the first calculation capability. The second query message is used to query identifier information of a calculation unit that is in the second front-end cloud and that has the first calculation capability. The third query message is used to query identifier information of a calculation unit that is in the third front-end cloud and that has the first calculation capability.

230. The scheduler receives a first response message, a second response message, and a third response message that are sent by the cloud controller EC1, the cloud controller EC2, and the cloud controller EC3, respectively.

The first response message sent by the cloud controller EC1 includes identifier information of a calculation unit that is selected from the first front-end cloud by the cloud controller EC1 of the first front-end cloud and that has the first calculation capability. In this embodiment, the calculation unit that is selected from the first front-end cloud by the cloud controller EC1 of the first front-end cloud and that has the first calculation capability is the EN1. Optionally, the first response message further includes information about a calculation capability of a calculation unit selected by the cloud controller EC1.

Optionally, the first front-end cloud may include multiple calculation units having the first calculation capability. The cloud controller EC1 of the first front-end cloud may send information of some or all of calculation units having the first calculation capability to the scheduler. Therefore, one or more than one calculation unit having the first calculation capability may be selected from the first front-end cloud by the cloud controller EC1 of the first front-end cloud.

The second response message sent by the cloud controller EC2 includes identifier information of a calculation unit that is selected from the second front-end cloud by the cloud controller EC2 of the second front-end cloud and that has the first calculation capability. In this embodiment, the calculation unit that is selected from the second front-end cloud by the cloud controller EC2 of the second front-end cloud and that has the first calculation capability is the EN2. Optionally, the second response message further includes information about a calculation capability of a calculation unit selected by the cloud controller EC2.

The third response message sent by the cloud controller EC3 includes information used to indicate that the third front-end cloud does not include a calculation unit having the first calculation capability. Optionally, it is also possible that the cloud controller EC3 does not send the third response message, and when not receiving the third response message within a preset period of time, the scheduler determines that the third front-end cloud does not include information about a calculation unit having the first calculation capability.

240. The scheduler determines a target calculation unit according to the first response message, the second response message, and the third response message. In this embodiment, a user terminal requesting the first application is a user terminal a. The target calculation unit determined in this embodiment is the calculation unit EN1 in the first front-end cloud. Optionally, the scheduler may also determine the target calculation unit according to the first response message and the second response message and further according to that the third response message is not received within the preset period of time.

Optionally, the target calculation unit is a calculation unit, that has a shortest distance from the user terminal a and that is in at least one calculation unit that is obtained by querying by the scheduler and that has the calculation capability. For example, when the at least one calculation unit that is obtained by querying by the scheduler and that has the calculation capability includes the calculation unit EN1 in the first front-end cloud and the calculation unit EN2 in the second front-end cloud, the target calculation unit is a calculation unit, that has the shorter distance from the user terminal a and that is in the calculation unit EN1 and the calculation unit EN2.

The distance includes a physical distance, a network distance, or a weight distance.

The physical distance may be determined by using the following method:

acquiring latitude and longitude coordinates of the calculation unit EN1, the calculation unit EN2, and the user terminal a, respectively;

calculating a physical distance from the calculation unit EN1 to the user terminal a and a physical distance from the calculation unit EN2 to the user terminal a, respectively; and comparing the foregoing two physical distances, and determining the calculation unit corresponding to the shorter physical distance as the target calculation unit.

Optionally, during the calculation of the foregoing two physical distances, the latitude and longitude coordinates of the calculation unit EN1 may be replaced with latitude and longitude coordinates of the cloud controller EC1, and the latitude and longitude coordinates of the calculation unit EN2 may be replaced with latitude and longitude coordinates of the cloud controller EC2. A calculation result obtained in this way is slightly low in precision, but is still acceptable in most cases.

The network distance may be implemented by using various technologies such as the Application-Layer Traffic Optimization (Application-Layer Traffic Optimization in English, and the English abbreviation being ALTO), the General Network Protocol (General Network Protocol in English, and the English abbreviation being GNP), or the Internet Distance Map Service (Internet Distance Map Service in English, and the English abbreviation being IDMaps). In this embodiment, the ALTO is used as an example for description with reference to FIG. 5.

Figure 5:
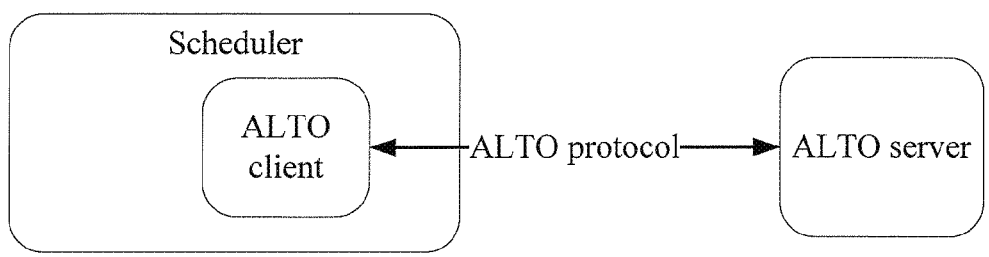
FIG. 5 is a schematic diagram of a network including a scheduler and an ALTO server according to an embodiment of the present invention.

As shown in FIG. 5, a scheduler includes an ALTO client. The ALTO client interacts with an ALTO server outside the scheduler by using the ALTO protocol.

The scheduler acquires an IP address of a user terminal a, an IP address and a cloud identifier of a first front-end cloud, and an IP address and a cloud identifier of a second front-end cloud.

The ALTO client in the scheduler sends to the ALTO server the IP address of the user terminal a, the IP address of the first front-end cloud, and the IP address of the second front-end cloud, to request the ALTO server to determine a network distance from the first front-end cloud to the user terminal a and a network distance from the second front-end cloud to the user terminal a.

The ALTO server sends to the ALTO client the determined network distance from the first front-end cloud to the user terminal a and the determined network distance from the second front-end cloud to the user terminal a.

On a network including multiple front-end clouds, a distance from a front-end cloud to a user terminal is approximately equal to a distance from a calculation unit in the front-end cloud to the user terminal. Therefore, the network distance from the first front-end cloud to the user terminal a is used to represent a network distance from the calculation unit EN1 to the user terminal a, and the network distance from the second front-end cloud to the user terminal a is used to represent a network distance from the calculation unit EN2 to the user terminal a.

The weight distance refers to a product of multiplying a physical distance by a weight coefficient, or, a product of multiplying a network distance by a weight coefficient.

Figure 6:
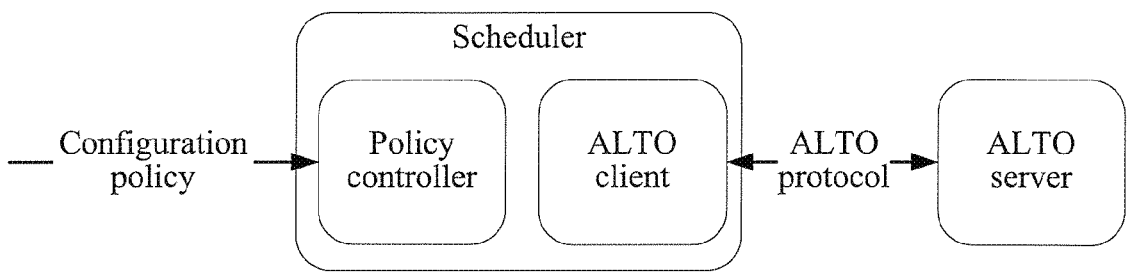
FIG. 6 is a schematic diagram of a network including a scheduler and an ALTO server according to an embodiment of the present invention.

On the network shown in FIG. 6, a policy cloud controller configures a weight factor k for multiple front-end clouds, respectively. For example, a weight factor configured for the first front-end cloud is k1, and k1 is valid for each calculation unit in the first front-end cloud; a weight factor configured for the second front-end cloud is k2, and k2 is valid for each calculation unit in the second front-end cloud.

After it is determined that the ALTO server sends to the ALTO client the determined network distance from the calculation unit EN1 to the user terminal a and the determined network distance from the calculation unit EN2 to the user terminal a, the scheduler multiplies k1 by the network distance from the calculation unit EN1 to the user terminal a to obtain a weight distance from the calculation unit EN1 to the user terminal a, and the scheduler multiplies k2 by the network distance from the calculation unit EN2 to the user terminal a to obtain a weight distance from the calculation unit EN2 to the user terminal a.

Step 250. The scheduler sends a fourth query message to a cloud controller of a front-end cloud corresponding to the target calculation unit, that is, a cloud controller 1, and queries whether a runtime library required for the first application is installed in the target calculation unit.

Step 260. The scheduler receives a fourth response message sent by the cloud controller 1, and when the fourth response message indicates that the runtime library required for the first application is not installed in the calculation unit EN1, performs steps 270 to 290, or when the fourth response message indicates that the runtime library required for the first application is installed in the calculation unit EN1, performs step 290.

Step 270. The scheduler sends a notification message to the calculation unit EN1 to inform the calculation unit EN1 to install the runtime library required for the first application.

Step 280. The scheduler receives an installation success message sent by the calculation unit EN1.

Step 290. The scheduler deploys the first application to the calculation unit EN1.

After determining the target calculation unit, the scheduler may download the first application from the first central cloud. In addition, the first application may also be not downloaded by the scheduler from the first central cloud, and instead, is sent actively by the first central cloud to the scheduler. For example, a first request sent by the cloud controller of the first central cloud to the scheduler carries the first application.

Figure 7:
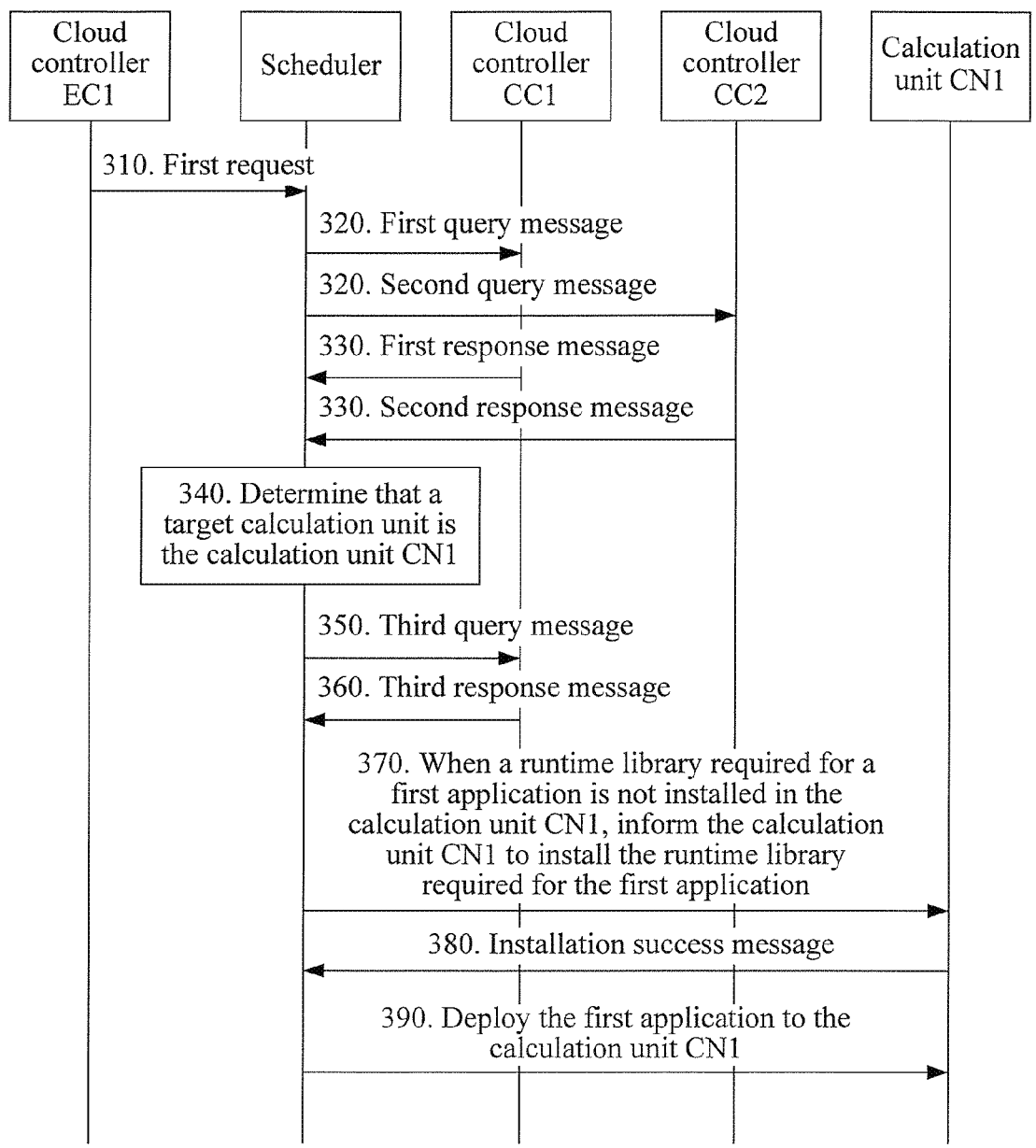
FIG. 7 is a schematic diagram of an application deployment method according to an embodiment of the present invention.

An embodiment shown in FIG. 7 discloses an application deployment method, which is applicable to the network shown in FIG. 3c. The method is used to deploy a first application in a front-end cloud to a central cloud. The network includes a first front-end cloud, a cloud controller EC1 is a cloud controller of the first front-end cloud; the network further includes a first central cloud and a second central cloud, a cloud controller CC1 is a cloud controller of the first central cloud, and a cloud controller CC2 is a cloud controller of the second central cloud. The method specifically includes the following content.

310. The controller EC1 sends a first request to a scheduler, where the first request is used to deploy the first application in the first front-end cloud to a central cloud.

The first request includes information about a calculation capability required for the first application; herein, the calculation capability required for the first application may be referred to as a first calculation capability.

320. The scheduler sends a first query message and a second query message to the controller CC1 and the controller CC2, respectively. 320 may also be understood as two operations without an order.

The first query message and the second query message both include the information about the first calculation capability, the first query message is used to query identifier information of a calculation unit that is in the first central cloud and that has the calculation capability, and the second query message is used to query identifier information of a calculation unit that is in the second central cloud and that has the calculation capability.

330. The scheduler receives a first response message and a second response message that are sent by the cloud controller CC1 and the cloud controller CC2, respectively.

The first response message sent by the cloud controller CC1 includes identifier information of a calculation unit that is selected from the first central cloud by the cloud controller CC1 and that has the first calculation capability. Optionally, the first response message further includes information about a calculation capability of a calculation unit selected by the cloud controller CC1.

The second response message sent by the cloud controller CC2 includes identifier information of a calculation unit that is selected from the second central cloud by the cloud controller CC2 and that has the first calculation capability. Optionally, the second response message further includes information about a calculation capability of a calculation unit selected by the cloud controller CC2.

340. The scheduler determines a target calculation unit according to the first response message and the second response message. In this embodiment, a user terminal requesting the first application is a user terminal a. In this embodiment, the determined target calculation unit is a calculation unit CN1 in the first central cloud.

Optionally, the target calculation unit is a calculation unit that has a shortest distance from the user terminal a and that is in at least one calculation unit that is obtained by querying by the scheduler and that has the calculation capability. For example, when the at least one calculation unit that is obtained by querying by the scheduler and that has the calculation capability includes the calculation unit CN1 in the first central cloud and a calculation unit CN2 in the second central cloud, the target calculation unit is a calculation unit that has the shorter distance from the user terminal a and that is in the calculation unit CN1 and the calculation unit CN2. In this embodiment, the calculation unit CN1 has the shorter distance from the user terminal a. The distance includes a physical distance, a network distance, or a weight distance.

350. The scheduler sends a third query message to a cloud controller corresponding to the target calculation unit, that is, the cloud controller CC1, and queries whether a runtime library required for the first application is installed in the target calculation unit.

360. The scheduler receives a third response message sent by a cloud controller 2; and when the third response message indicates that the runtime library required for the first application is not installed in the calculation unit CN1, performs 370 to 390; or when the third response message indicates that the runtime library required for the first application is installed in the calculation unit CN1, performs 390.

370. The scheduler sends a notification message to the calculation unit CN1 to inform the calculation unit CN1 to install the runtime library required for the first application.

Step 380. The scheduler receives an installation success message sent by the calculation unit CN1.

Step 390. The scheduler deploys the first application to the calculation unit CN1.

Figure 8:
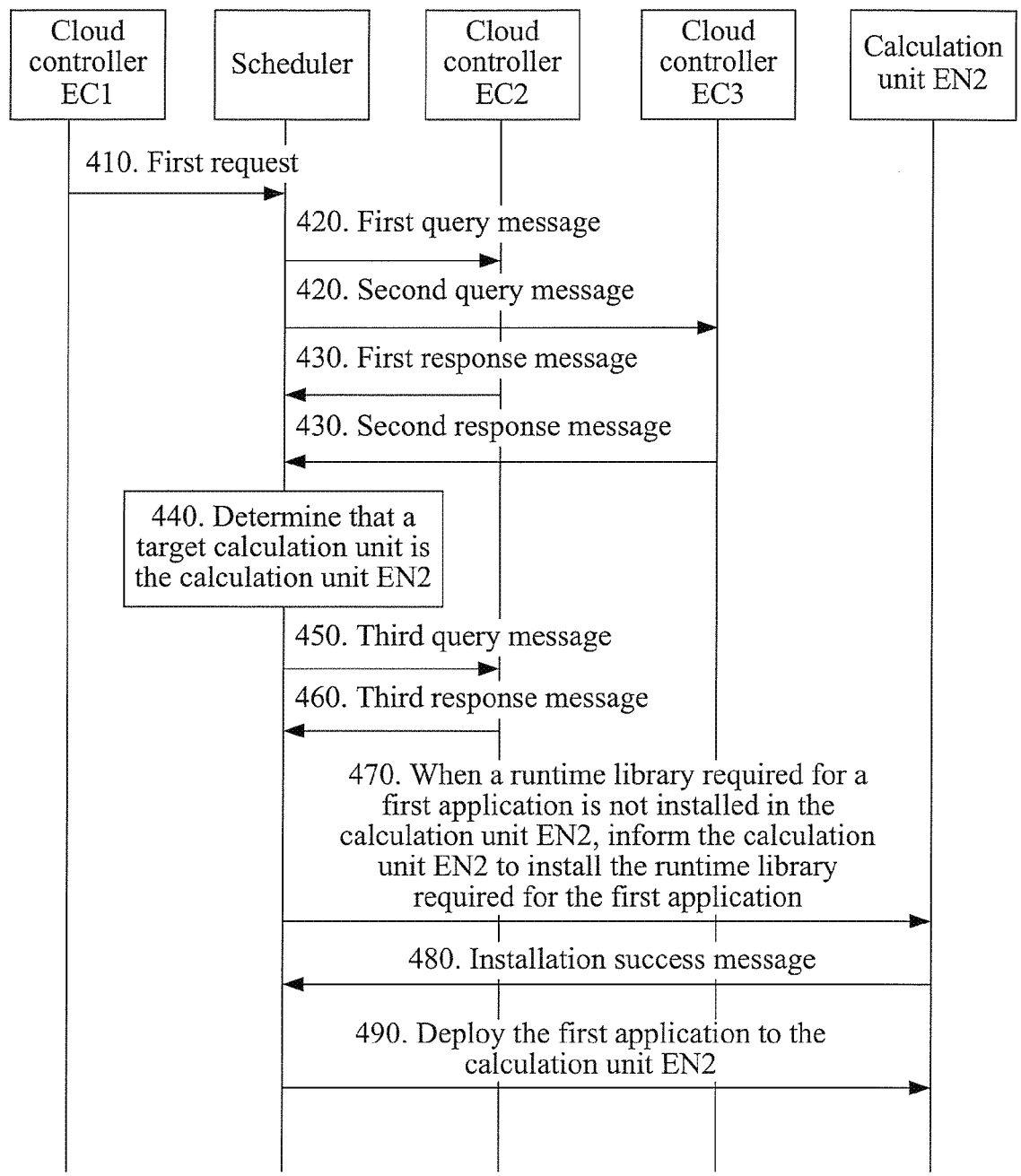
FIG. 8 is a schematic diagram of an application deployment method according to an embodiment of the present invention.

An embodiment shown in FIG. 8 discloses an application deployment method, which is applicable to the network shown in FIG. 3d. The method is used to deploy a first application in a front-end cloud to another front-end cloud. The network includes a first front-end cloud, a second front-end cloud, and a third front-end cloud, and cloud controllers of the three front-end clouds are a cloud controller EC1, a cloud controller EC2, and a cloud controller EC3, respectively. The method specifically includes the following content.

410. The controller EC1 sends a first request to a scheduler, where the first request is used to deploy the first application in the first front-end cloud to another front-end cloud.

The first request includes information about a calculation capability required for the first application; herein, the calculation capability required for the first application may be referred to as a first calculation capability.

420. The scheduler sends a first query message and a second query message to the controller EC2 and the controller EC3, respectively. 320 may also be understood as two operations without an order.

The first query message and the second query message both include the information about the first calculation capability, the first query message is used to query identifier information of a calculation unit that is in the second front-end cloud and that has the calculation capability, and the second query message is used to query identifier information of a calculation unit that is in the third front-end cloud and that has the calculation capability.

Step 430. The scheduler receives a first response message and a second response message that are sent by the cloud controller EC2 and the cloud controller EC3, respectively.

The first response message sent by the cloud controller EC2 includes identifier information of a calculation unit that is selected from the second front-end cloud by the cloud controller EC2 and that has the first calculation capability. Optionally, the second response message further includes information about a calculation capability of a calculation unit selected by the cloud controller EC2.

The second response message sent by the cloud controller EC3 includes identifier information of a calculation unit that is selected from the third front-end cloud by the cloud controller EC3 and that has the first calculation capability. Optionally, the third response message further includes information about a calculation capability of a calculation unit selected by the cloud controller EC3.

440. The scheduler determines a target calculation unit according to the first response message and the second response message. In this embodiment, a user terminal requesting the first application is a user terminal a. In this embodiment, the determined target calculation unit is a calculation unit EN2 in the second front-end cloud.

Optionally, the target calculation unit is a calculation unit that has a shortest distance from the user terminal a and that is in at least one calculation unit that is obtained by querying by the scheduler and that has the calculation capability. For example, when the at least one calculation unit that is obtained by querying by the scheduler and that has the calculation capability includes the calculation unit EN2 in the second front-end cloud and a calculation unit EN3 in the third front-end cloud, the target calculation unit is a calculation unit that has the shorter distance from the user terminal a and that is in the calculation unit EN2 and the calculation unit EN3. In this embodiment, the distance from the calculation unit EN2 to the user terminal a is shorter. The distance includes a physical distance, a network distance, or a weight distance.

450. The scheduler sends a third query message to a cloud controller corresponding to the target calculation unit, that is, the cloud controller EC2, and queries whether a runtime library required for the first application is installed in the target calculation unit.

460. The scheduler receives a third response message sent by the cloud controller EC2, and when the third response message indicates that the runtime library required for the first application is not installed in the calculation unit EN2, performs 470 to 490, or when the third response message indicates that the runtime library required for the first application is installed in the calculation unit EN2, performs 490.

470. The scheduler sends a notification message to the calculation unit EN2 to inform the calculation unit EN2 to install the runtime library required for the first application.

480. The scheduler receives an installation success message sent by the calculation unit EN2.

490. The scheduler deploys the first application to the calculation unit EN2.

Figure 9:
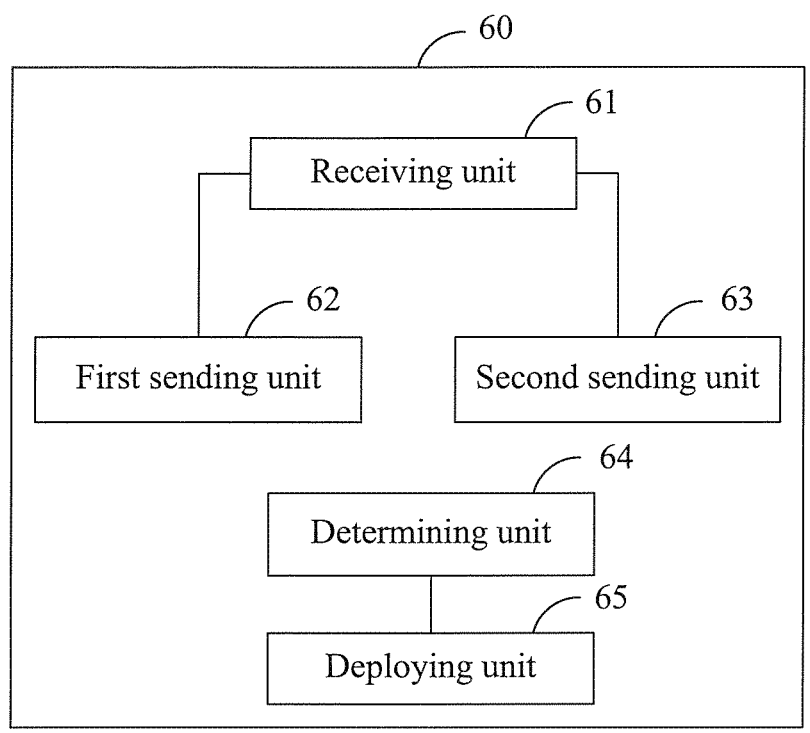
FIG. 9 is a schematic diagram of a scheduler according to an embodiment of the present invention.

FIG. 9 shows a scheduler 60 in an embodiment of the present invention. The scheduler 60 is configured to manage a first cloud, a second cloud, and a third cloud. As shown in FIG. 9, the scheduler includes a receiving unit 61, a first sending unit 62, a second sending unit 63, a determining unit 64, and a deploying unit 65.

The receiving unit 61 is configured to receive an application deployment request sent for a first application by a cloud controller of the first cloud.

The first sending unit 62 sends, after the receiving unit 61 receives the application deployment request, a first query message to a cloud controller of the second cloud, where the first query message includes information about a calculation capability required for the first application, the first query message is used to query identifier information of a calculation unit that is in the second cloud and that has the calculation capability, and the calculation capability required for the first application is a first calculation capability.

Optionally, the information about the first calculation capability includes any one or more of a central processing unit (CPU) dominant frequency, a memory capacity, network bandwidth information, and programming language running environment information.

The second sending unit 63 sends, after the receiving unit 61 receives the application deployment request, a second query message to a cloud controller of the third cloud, where the second query message includes the information about the first calculation capability, and the second query message is used to query identifier information of a calculation unit that is in the third cloud and that has the first calculation capability.

It should be noted that, the first sending unit 62 and the second sending unit 63 are independent from each other, and the operation executed by the first sending unit 62 may be executed before the operation executed by the second sending unit 63, may also be executed after the operation executed by the second sending unit 63, or may further be executed at the same time as the operation executed by the second sending unit 63.

The determining unit 64 is configured to determine a target calculation unit from at least one calculation unit that is obtained by querying by using the first query message and the second query message and that has the first calculation capability.

There may be only one or may also be more than one calculation unit that is obtained by querying by using the first query message and the second query message and that has the first calculation capability.

Optionally, when only one calculation unit having the first calculation capability is obtained by querying, the unique calculation unit is the target calculation unit.

Optionally, when more than one calculation unit having the first calculation capability is obtained by querying, the target calculation unit is: a calculation unit that has a shortest distance from a user terminal requesting the first application and that is in the more than one calculation unit having the first calculation capability. Optionally, the distance includes a physical distance, a network distance, or a weight distance.

Optionally, when more than one calculation unit having the first calculation capability is obtained by querying, the target calculation unit may also be a calculation unit randomly selected by the scheduler from the calculation unit that are obtained by querying and that have the first calculation capability.

The physical distance refers to a distance between two physical devices, which is determined according to respective physical positions of the two physical devices. For example, the physical positions may be in latitude and longitude coordinates.

The network distance refers to a forward hop count between two physical devices or a period of time during which a packet is transmitted between two physical devices.

The weight distance refers to a product of multiplying a physical distance by a weight coefficient, or, a product of multiplying a network distance by a weight coefficient.

The deploying unit 65 is configured to: after the determining unit 64 determines that a runtime library required for the first application is installed in the target calculation unit, deploy the first application to the target calculation unit.

Optionally, the deploying unit 65 is specifically configured to: send a runtime library query message to a cloud controller corresponding to the target calculation unit, and query whether the runtime library required for the first application is installed in the target calculation unit; optionally, after it is determined that the runtime library is not installed in the target calculation unit, inform the target calculation unit to install the runtime library; and after the target calculation unit completes the installation of the runtime library, deploy the first application to the target calculation unit. Optionally, after it is determined that the runtime library is installed in the target calculation unit, the deploying unit 65 deploys the first application to the target calculation unit.

That the deploying unit 65 deploys the first application to the target calculation unit may be understood as that the deploying unit 65 itself deploys the first application to the target calculation unit, or may also be understood as that the deploying unit 65 controls or manages another device, and the another device deploys the first application to the target calculation unit.

In addition, on a network including clouds, different clouds may play different roles; for example, a cloud that is located in the center of the network may be referred to as a central cloud, and a cloud that is located between the central cloud and a user may be referred to as a front-end cloud. The first cloud, the second cloud, and the third cloud in this embodiment may play respective roles.

For example, the first cloud is a first central cloud, the second cloud is a first front-end cloud, and the third cloud is a second front-end cloud; or, the first cloud is a first front-end cloud, the second cloud is a first central cloud, and the third cloud is a second central cloud; or, the first cloud is a first front-end cloud, the second cloud is a second front-end cloud, and the third cloud is a third front-end cloud.

As can be known from the content in this embodiment, a scheduler first determines, from a second cloud and a third cloud, a calculation unit having a calculation capability required for a first application, then determines a target calculation unit from the determined calculation unit, and in a case in which a runtime library is installed in the target calculation unit, deploys the first application in a first cloud to the target calculation unit, to determine one suitable cloud from a network including multiple clouds to deploy the first application.

Figure 10:
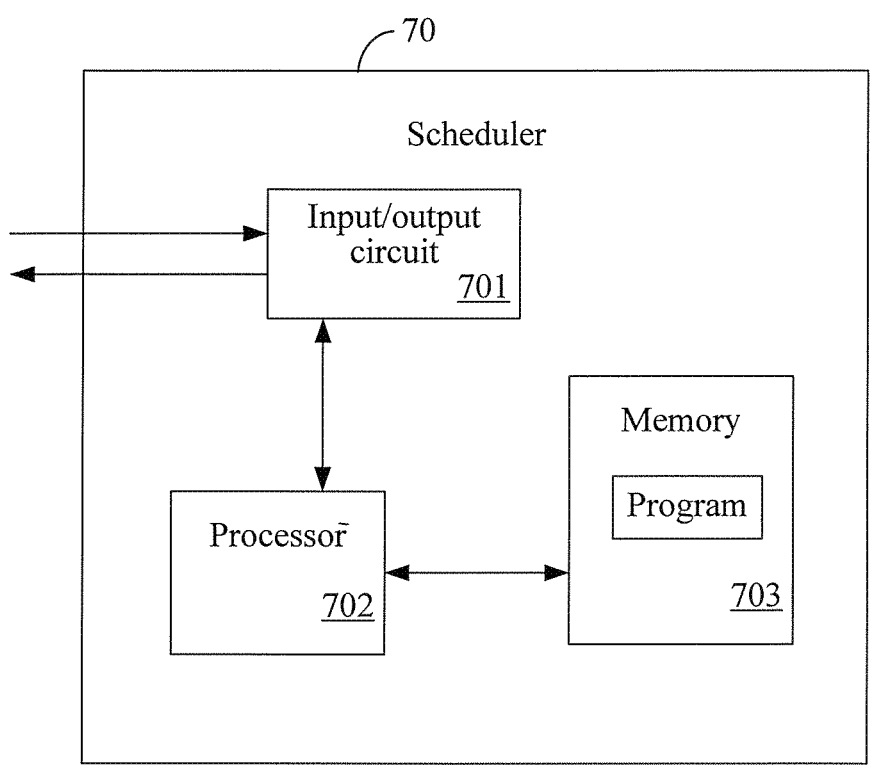
FIG. 10 is a schematic diagram of a scheduler according to an embodiment of the present invention.

FIG. 10 shows a scheduler 70 in an embodiment of the present invention. The scheduler 70 is configured to manage a first cloud, a second cloud, and a third cloud. The scheduler 70 includes an input/output circuit (I/O circuit) 701, a processor (processor) 702, and a memory (memory) 703. The memory 703 stores a program or an instruction that can be executed by the processor 702.

The input/output circuit 701 is configured to receive an application deployment request sent for a first application by a cloud controller of the first cloud. After receiving the application deployment request, the input/output circuit 701 is further configured to send a first query message and a second query message to a cloud controller of the second cloud, where the first query message includes information about a calculation capability required for the first application, the first query message is used to query identifier information of a calculation unit that is in the second cloud and that has the calculation capability, and the calculation capability required for the first application is a first calculation capability, the second query message includes the information about the first calculation capability, and the second query message is used to query identifier information of a calculation unit that is in the third cloud and that has the first calculation capability.

Optionally, the information about the first calculation capability includes any one or more of a central processing unit (CPU) dominant frequency, a memory capacity, network bandwidth information, and programming language running environment information.

The foregoing operation executed by the input/output circuit 701 may be completed under the control of the processor 702, or may also be accomplished by the input/output circuit 701 under the control of another control circuit, for example, under a control circuit inside the input/output circuit 701.

The processor 702 that has read the program or instruction determines a target calculation unit from at least one calculation unit that is obtained by querying by using the first query message and the second query message and that has the first calculation capability.

There may be only one or may also be more than one calculation unit that is obtained by querying by using the first query message and the second query message and that has the first calculation capability.

Optionally, when only one calculation unit having the first calculation capability is obtained by querying, the unique calculation unit is the target calculation unit.

Optionally, when more than one calculation unit having the first calculation capability is obtained by querying, the target calculation unit is: a calculation unit that has a shortest distance from a user terminal requesting the first application and that is in the more than one calculation unit having the first calculation capability. Optionally, the distance includes a physical distance, a network distance, or a weight distance.

Optionally, when more than one calculation unit having the first calculation capability is obtained by querying, the target calculation unit may also be a calculation unit randomly selected by the scheduler from the calculation unit that are obtained by querying and that have the first calculation capability.

The physical distance refers to a distance between two physical devices, which is determined according to respective physical positions of the two physical devices. For example, the physical positions may be in latitude and longitude coordinates.

The network distance refers to a forward hop count between two physical devices or a period of time during which a packet is transmitted between two physical devices.

The weight distance refers to a product of multiplying a physical distance by a weight coefficient, or, a product of multiplying a network distance by a weight coefficient.

After it is determined that a runtime library required for the first application is installed in the target calculation unit, the processor 702 deploys the first application to the target calculation unit by using the input/output circuit 701.

Specifically, the processor 702 sends, by using the input/output circuit 701, a runtime library query message to a cloud controller corresponding to the target calculation unit, and queries whether the runtime library required for the first application is installed in the target calculation unit; optionally, after it is determined that the runtime library is not installed in the target calculation unit, notifies the target calculation unit of installing the runtime library, and after the target calculation unit completes the installation of the runtime library, deploys the first application to the target calculation unit. Optionally, after it is determined that the runtime library is installed in the target calculation unit, the processor 702 deploys the first application to the target calculation unit.

In the scheduler 70, the processor 702 cooperates with the input/output circuit 701 according to the program or instruction to execute all operations of the scheduler in the embodiments corresponding to FIG. 2, FIG. 4, FIG. 7, FIG. 8, and FIG. 9.

As can be known from the content in this embodiment, a scheduler first determines, from a second cloud and a third cloud, a calculation unit having a calculation capability required for a first application, then determines a target calculation unit from the determined calculation unit, and in a case in which a runtime library is installed in the target calculation unit, deploys the first application in a first cloud to the target calculation unit, to determine one suitable cloud from a network including multiple clouds to deploy the first application.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely exemplary specific implementation manners of the present invention, but are not intended to limit the protection scope of the present invention. Any variation or replacement readily figured out by a person skilled in the art within the technical scope disclosed in the present invention shall fall within the protection scope of the present invention.

What is claimed is:

1. An application deployment method, comprising:
receiving, by a scheduler, an application deployment request sent for a first application by a cloud controller of a first cloud;
after receiving the application deployment request, sending, by the scheduler, a first query message to a cloud controller of a second cloud, wherein the first query message comprises information about a calculation capability required for the first application, the first query message is used to query identifier information of a calculation unit that is in the second cloud and that has the calculation capability, and the calculation capability required for the first application is a first calculation capability;
after receiving the application deployment request, sending, by the scheduler, a second query message to a cloud controller of a third cloud, wherein the second query message comprises the information about the first calculation capability, and the second query message is used to query identifier information of a calculation unit that is in the third cloud and that has the first calculation capability;
determining, by the scheduler, a target calculation unit from at least one calculation unit that is obtained by querying by using the first query message and the second query message and that has the first calculation capability; and
deploying, by the scheduler, the first application to the target calculation unit after determining that a runtime library required for the first application is installed in the target calculation unit, wherein the scheduler is configured to manage the first cloud, the second cloud, and the third cloud;
wherein when the at least one calculation unit is more than one calculation unit, the target calculation unit comprises:
a calculation unit that has a shortest distance from a user terminal requesting the first application and that is in the more than one calculation unit having the first calculation capability, wherein the distance comprises a network distance, or a weight distance, wherein the network distance is a forward hop count between two physical devices or a period of time during which a packet is transmitted between two physical devices, wherein the weight distance is a product of multiplying a physical distance by a weight coefficient, or, a product of multiplying a network distance by a weight coefficient, wherein the two physical devices are the user terminal and the target calculation unit.

2. The method according to claim 1, wherein deploying, by the scheduler, the first application to the target calculation unit after determining that a runtime library required for the first application is installed in the target calculation unit comprises:
sending, by the scheduler, a runtime library query message to a cloud controller corresponding to the target calculation unit, and querying whether the runtime library required for the first application is installed in the target calculation unit;
after determining that the runtime library is not installed in the target calculation unit, informing the target calculation unit to install the runtime library; and
after the target calculation unit completes the installation of the runtime library, deploying, by the scheduler, the first application to the target calculation unit.

3. The method according to claim 1, wherein deploying, by the scheduler, the first application to the target calculation unit after determining that a runtime library required for the first application is installed in the target calculation unit comprises:
sending, by the scheduler, a runtime library query message to a cloud controller corresponding to the target calculation unit, and querying whether the runtime library required for the first application is installed in the target calculation unit; and
after determining that the runtime library is installed in the target calculation unit, deploying the first application to the target calculation unit.

4. The method according to claim 1, wherein the information about the first calculation capability comprises any one or more of a central processing unit (CPU) dominant frequency, a memory capacity, network bandwidth information, and programming language running environment information.

5. The method according to claim 1, wherein:
the first cloud is a first central cloud, the second cloud is a first front-end cloud, and the third cloud is a second front-end cloud; or
the first cloud is a first front-end cloud, the second cloud is a first central cloud, and the third cloud is a second central cloud; or
the first cloud is a first front-end cloud, the second cloud is a second front-end cloud, and the third cloud is a third front-end cloud.

6. A scheduler for managing a first cloud, a second cloud, and a third cloud, the scheduler comprising:
an input/output (I/O) circuit;
a processor; and
a memory;
the I/O circuit configured to receive an application deployment request sent for a first application by a cloud controller of the first cloud;
after receiving the application deployment request, the I/O circuit is further configured to send a first query message to a cloud controller of the second cloud, wherein the first query message comprises information about a calculation capability required for the first application, the first query message is used to query identifier information of a calculation unit that is in the second cloud and that has the calculation capability, and the calculation capability required for the first application is a first calculation capability;

after receiving the application deployment request, the I/O circuit is further configured to send a second query message to a cloud controller of the third cloud, wherein the second query message comprises the information about the first calculation capability, and the second query message is used to query identifier information of a calculation unit that is in the third cloud and that has the first calculation capability;

the processor is configured to read an instruction stored in the memory to:
  determine a target calculation unit from at least one calculation unit that is obtained by querying by using the first query message and the second query message and that has the first calculation capability; and
  after it is determined that a runtime library required for the first application is installed in the target calculation unit, deploy the first application to the target calculation unit;

wherein when the at least one calculation unit is more than one calculation unit, the target calculation unit comprises:
  a calculation unit that has a shortest distance from a user terminal requesting the first application and that is in the more than one calculation unit having the first calculation capability, wherein the distance comprises a network distance, or a weight distance, wherein the network distance is a forward hop count between two physical devices or a period of time during which a packet is transmitted between two physical devices, wherein the weight distance is a product of multiplying a physical distance by a weight coefficient, or, a product of multiplying a network distance by a weight coefficient, wherein the two physical devices are the user terminal and the target calculation unit.

7. The scheduler according to claim 6, wherein the processor is further configured to read the instruction stored in the memory to:
  send a runtime library query message to a cloud controller corresponding to the target calculation unit, and query whether the runtime library required for the first application is installed in the target calculation unit;
  after it is determined that the runtime library is not installed in the target calculation unit, inform the target calculation unit to install the runtime library; and
  after the target calculation unit completes the installation of the runtime library, deploy the first application to the target calculation unit.

8. The scheduler according to claim 6, wherein the processor is further configured to read the instruction stored in the memory to:
  send a runtime library query message to a cloud controller corresponding to the target calculation unit, and query whether the runtime library required for the first application is installed in the target calculation unit; and
  after it is determined that the runtime library is installed in the target calculation unit, deploy the first application to the target calculation unit.

9. The scheduler according to claim 6, wherein the information about the first calculation capability comprises any one or more of a central processing unit (CPU) dominant frequency, a memory capacity, network bandwidth information, and programming language running environment information.

10. The scheduler according to claim 6, wherein:
  the first cloud is a first central cloud, the second cloud is a first front-end cloud, and the third cloud is a second front-end cloud; or
  the first cloud is a first front-end cloud, the second cloud is a first central cloud, and the third cloud is a second central cloud; or
  the first cloud is a first front-end cloud, the second cloud is a second front-end cloud, and the third cloud is a third front-end cloud.

* * * * *